(12) United States Patent
Goja et al.

(10) Patent No.: US 10,430,164 B2
(45) Date of Patent: *Oct. 1, 2019

(54) AUTOMATION OF CANONICAL MODEL USAGE IN APPLICATION DEVELOPMENT PROCESSES

(71) Applicant: United Parcel Service of America, Inc., Atlanta, GA (US)

(72) Inventors: Asheesh Goja, Upper Saddle River, NJ (US); Vidhya Chari, Mahwah, NJ (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/868,565

(22) Filed: Jan. 11, 2018

(65) Prior Publication Data

US 2018/0136911 A1    May 17, 2018

Related U.S. Application Data

(63) Continuation of application No. 14/742,797, filed on Jun. 18, 2015, now Pat. No. 9,904,521.

(51) Int. Cl.
| | |
|---|---|
| *G06F 9/44* | (2018.01) |
| *G06F 8/30* | (2018.01) |
| *G06F 8/51* | (2018.01) |
| *G06F 8/72* | (2018.01) |
| *G06F 9/54* | (2006.01) |
| *G06F 8/36* | (2018.01) |
| *G06F 17/22* | (2006.01) |

(52) U.S. Cl.
CPC .............. *G06F 8/31* (2013.01); *G06F 8/36* (2013.01); *G06F 8/51* (2013.01); *G06F 8/72* (2013.01); *G06F 9/54* (2013.01); *G06F 17/227* (2013.01)

(58) Field of Classification Search
CPC ..... G06F 8/31; G06F 8/36; G06F 8/51; G06F 8/72; G06F 9/54; G06F 17/227
USPC .................................................. 717/104–119
See application file for complete search history.

(56) References Cited

U.S. PATENT DOCUMENTS

| | | | |
|---|---|---|---|
| 7,234,109 B2 | 6/2007 | Atkinson | |
| 7,458,082 B1 * | 11/2008 | Slaughter | ................ G06F 9/547 713/153 |
| 7,698,684 B2 | 4/2010 | Baikov | |

(Continued)

OTHER PUBLICATIONS

Oracle, "The Java EE 5 Tutorial", 2010, Oracle Corporation, Chapters 33-35, Transactions, Resource Connections, Connector Architecture, pp. 989-1017.

(Continued)

*Primary Examiner* — Ted T. Vo
(74) *Attorney, Agent, or Firm* — Shook, Hardy & Bacon L.L.P.

(57) ABSTRACT

Computer program products, methods, systems, apparatuses, and computing entities are provided for enforcing usage of a canonical model. For example, machine-automatable artifacts that express the canonical model using a set of metadata constraints and a set of transformation rules can be received from a canonical model artifact repository. These machine-automatable artifacts can be converted into language-specific bindings and applications can subsequently utilize those language-specific bindings to enforce conformity to the canonical model.

21 Claims, 7 Drawing Sheets

(56) References Cited

U.S. PATENT DOCUMENTS

| | | | |
|---|---|---|---|
| 7,774,789 B1* | 8/2010 | Wheeler | G06F 9/44521 719/313 |
| 8,266,631 B1* | 9/2012 | Wheeler | G06F 9/449 719/313 |
| 8,495,098 B1 | 7/2013 | Kern et al. | |
| 8,700,681 B2 | 4/2014 | Baikov | |
| 8,739,022 B2 | 5/2014 | Chiu et al. | |
| 9,904,521 B2* | 2/2018 | Goja | G06F 8/51 |
| 2005/0080640 A1 | 4/2005 | Bhaskaran et al. | |
| 2008/0109801 A1 | 5/2008 | Levine et al. | |
| 2009/0300647 A1 | 12/2009 | Allen et al. | |
| 2010/0161629 A1 | 6/2010 | Palanisamy et al. | |

OTHER PUBLICATIONS

Oracle, "The Java EE 5 Tutorial", 2010, Oracle Corporation, Chapter 17, Binding between XML Schema and Java Classes, pp. 487-546.

Notice of Allowance and Fees Due (PTOL-85) dated Oct. 11, 2017 for U.S. Appl. No. 14/742,797.

Non-Final Rejection dated Aug. 25, 2016 for U.S. Appl. No. 14/742,797.

International Searching Authority, International Search Report and Written Opinion for International Application No. PCT/IB2016/053281, dated Sep. 16, 2016, 11 pages, European Patent Office, Netherlands.

International Preliminary Examining Authority, Written Opinion (Second) for International Application No. PCT/IB2016/053281, dated May 18, 2017, European Patent Office, Germany, 7 pages.

Final Rejection dated Feb. 9, 2017 for U.S. Appl. No. 14/742,797.

Codeldol, "Data Integration Guidelines", Jun. 2011, retrieved from http://codeidol.com/community/java/data-integration-guidelines/11252/, 8 pages.

Advisory Action (PTOL-303) dated May 25, 2017 for U.S. Appl. No. 14/742,797.

Office Action received for Canadian Patent Application No. 2,989,737, dated Sep. 24, 2018, 7 pages.

Oracle Corporation "The Java EE 5 Tutorial for Sun Java System Application Server 9.1", The Java E5 Tutorial, Chapter 35, Available at <https://docs.oracle.com/javaee/5/tutorial/doc/bnazf.html>, Jun. 2010, pp. 1011-1016.

Pinchedez, Clemente "Java Source Code Generation and Maven", Available at <http://blog.clempinch.com/java-source-code-generation-and-maven/>, Mar. 9, 2013, 4 pages.

* cited by examiner

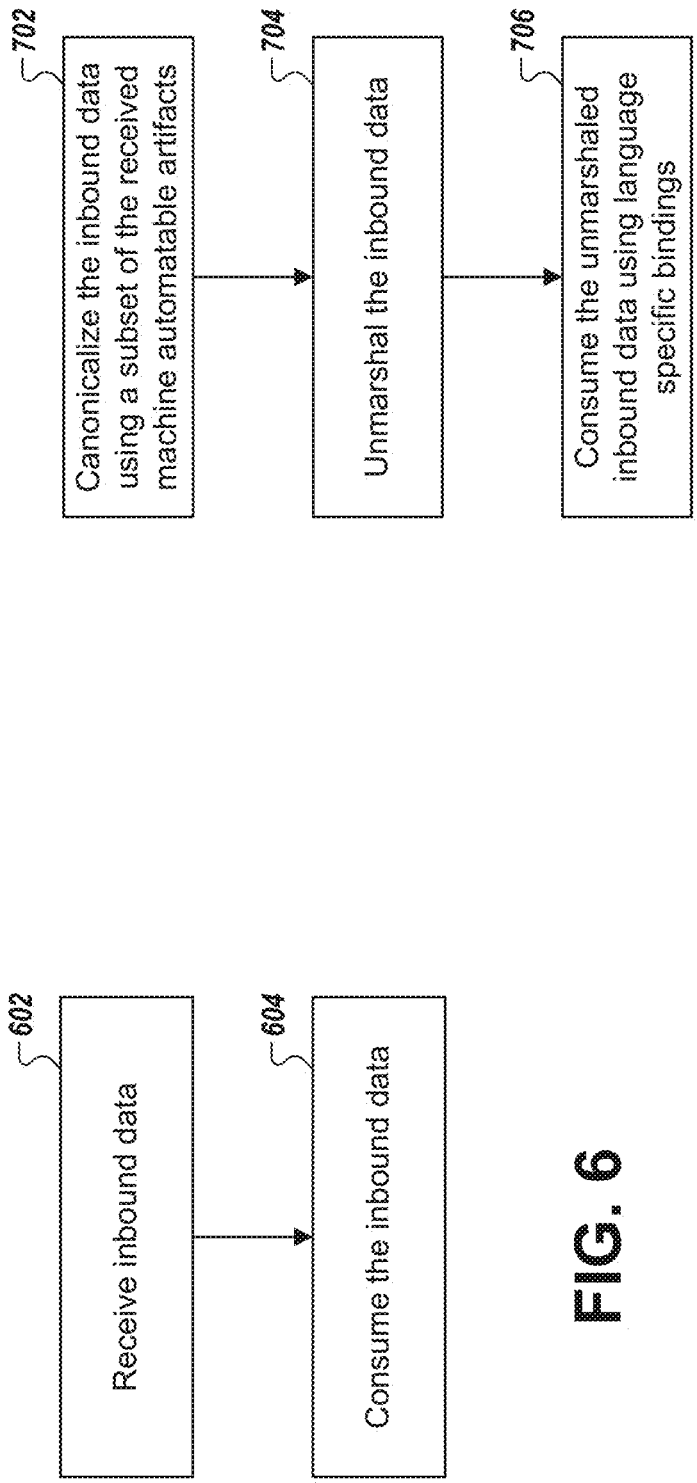

AUTOMATION OF CANONICAL MODEL USAGE IN APPLICATION DEVELOPMENT PROCESSES

CROSS-REFERENCE TO RELATED APPLICATIONS

This application is a continuation of U.S. application Ser. No. 14/742,797, filed Jun. 18, 2015, the contents of which are hereby incorporated herein in its entirety by reference.

BACKGROUND

Enterprise application integration (EAI) has become a central concern for improving interoperability and efficiency of enterprise software. Software applications are typically designed to address specific user goals or provide specific functionality, but are typically not designed to facilitate interaction with other applications, least of all those addressing seemingly unrelated business needs. However, with the growing reliance on software to solve various problems within organizations has come a growing need for this type of integration. Improving interoperability between applications can increase the ease of sharing data gathered or produced by multiple applications, which naturally produces an increase in the consistency of the data maintained by an organization, an increase in the amount of data accessible to each application within the organization, and as a result of both of these factors, an improvement in the utility, efficiency and reliability of enterprise software.

Many organizations utilize canonical models to facilitate EAI. In this regard, a canonical model provides a set of standardized metadata elements that reside in a propriety repository and define both the canonical form for messages that will be transmitted between applications and the transformation rules that contain mappings to the canonical model. Application development teams consume a canonical model by manually creating data contracts that are ostensibly designed to accept inbound messages conforming to the canonical model and format outbound messages that also conform to the canonical model.

BRIEF SUMMARY

In general, embodiments of the present invention provide methods, apparatuses, systems, computing devices, computing entities, and/or the like for automating the enforcement of canonical model implementation and relieving application development teams from having to attempt to manually implement canonical model compliance. As opposed to traditionally manual and ad hoc methods of implementing enterprise-wide adoption and enforcement of a canonical model, embodiments of the present invention generate constraints and transform rules that automatically and rigorously enforce canonical model validation rules across applications without the need for application development team intervention. Example embodiments described herein thus reduce the burden on application development teams while increasing the conformity to the canonical model of the various communications sent between various enterprise applications.

In accordance with one aspect, a method for enforcing usage of a canonical model is provided. In one embodiment, the method comprises receiving, by a computing entity, machine-automatable artifacts from a canonical model artifact repository, the machine-automatable artifacts expressing the canonical model using a set of metadata constraints and a set of transformation rules. The method further includes converting, by the computing entity, the received machine-automatable artifacts into language-specific bindings, and programming, by the computing entity, an application using the language-specific bindings to enforce conformity to the canonical model.

In some embodiments, converting the received machine-automatable artifacts into language-specific bindings uses one or more code generation plugins.

In some embodiments, the method may also include causing execution of the application. In this regard, execution of the application may include receiving inbound data and consuming the inbound data. To this end, in an instance in which the inbound data conforms to canonical form, consuming the inbound data may include unmarshaling the canonical XML data and consuming the unmarshaled canonical XML data using one or more of the language-specific bindings. Alternatively, in an instance in which the inbound data is not in canonical form, consuming the inbound data may first include canonicalizing the inbound data using one or more transformation rules from the set of transformation rules expressed by the machine-automatable artifacts to generate canonical XML data, followed by unmarshaling of the canonical XML data and consuming of the unmarshaled canonical XML data using one or more of the language-specific bindings.

Execution of the application may also include transmitting canonicalized outbound data. In this regard, transmitting the canonicalized outbound data may include converting an outbound message into a canonicalized outbound message using one or more of the language-specific bindings and marshaling the converted outbound message to generate an XML message. Transmitting the canonicalized outbound data may further include canonicalizing the data contained in the XML message using one or more transformation rules from the set of transformation rules expressed by the machine-automatable artifacts to produce the canonicalized outbound data, and validating the canonical outbound data using one or more metadata constraints from a subset of the language-specific bindings, after which the canonical outbound data is transmitted It should be understood that the machine-automatable artifacts may include a set of extensible markup language schema definitions (XSDs) that express the set of metadata constraints and may also include a set of canonical extensible stylesheet language transformations (XSLTs) that express the set of transformation rules.

In accordance with another aspect, a computer program product for enforcing usage of a canonical model is provided. The computer program product may comprise at least one computer-readable storage medium having computer-readable program code portions stored therein, the computer-readable program code portions comprising an executable portion configured to receive machine-automatable artifacts from a canonical model artifact repository, the machine-automatable artifacts expressing the canonical model using a set of metadata constraints and a set of transformation rules, an executable portion configured to convert the received machine-automatable artifacts into language-specific bindings, and an executable portion configured to program an application using the language-specific bindings to enforce conformity to the canonical model.

In some embodiments, converting the received machine-automatable artifacts into language-specific bindings uses one or more code generation plugins.

In some embodiments, the computer-readable program code portions may further comprise an executable portion configured to cause execution of the application. In this regard, execution of the application may include receiving inbound data and consuming the inbound data. To this end, in an instance in which the inbound data conforms to canonical form, consuming the inbound data may include unmarshaling the canonical XML data and consuming the unmarshaled canonical XML data using one or more of the language-specific bindings. Alternatively, in an instance in which the inbound data is not in canonical form, consuming the inbound data may first include canonicalizing the inbound data using one or more transformation rules from the set of transformation rules expressed by the machine-automatable artifacts to generate canonical XML data, followed by unmarshaling of the canonical XML data and consuming of the unmarshaled canonical XML data using one or more of the language-specific bindings.

Execution of the application may also include transmitting canonicalized outbound data. In this regard, transmitting the canonicalized outbound data may include converting an outbound message into a canonicalized outbound message using one or more of the language-specific bindings and marshaling the converted outbound message to generate an XML message. Transmitting the canonicalized outbound data may further include canonicalizing the data contained in the XML message using one or more transformation rules from the set of transformation rules expressed by the machine-automatable artifacts to produce the canonicalized outbound data, and validating the canonical outbound data using one or more metadata constraints from a subset of the language-specific bindings, after which the canonical outbound data is transmitted It should be understood that the machine-automatable artifacts may include a set of extensible markup language schema definitions (XSDs) that express the set of metadata constraints and may also include a set of canonical extensible stylesheet language transformations (XSLTs) that express the set of transformation rules.

In accordance with yet another aspect, an apparatus for enforcing usage of a canonical model is provided. The apparatus may comprise at least one processor and at least one memory including computer program code configured to, with the processor, cause the apparatus to receive machine-automatable artifacts from a canonical model artifact repository, the machine-automatable artifacts expressing the canonical model using a set of metadata constraints and a set of transformation rules, convert the received machine-automatable artifacts into language-specific bindings; and program an application using the language-specific bindings to enforce conformity to the canonical model.

In some embodiments, the at least one memory and the program code may be further configured to, with the processor, cause the apparatus to cause execution of the application. In this regard, execution of the application may include receiving inbound data and consuming the inbound data. To this end, in an instance in which the inbound data conforms to canonical form, consuming the inbound data may include unmarshaling the canonical XML data and consuming the unmarshaled canonical XML data using one or more of the language-specific bindings. Alternatively, in an instance in which the inbound data is not in canonical form, consuming the inbound data may first include canonicalizing the inbound data using one or more transformation rules from the set of transformation rules expressed by the machine-automatable artifacts to generate canonical XML data, followed by unmarshaling of the canonical XML data and consuming of the unmarshaled canonical XML data using one or more of the language-specific bindings.

Execution of the application may also include transmitting canonicalized outbound data. In this regard, transmitting the canonicalized outbound data may include converting an outbound message into a canonicalized outbound message using one or more of the language-specific bindings and marshaling the converted outbound message to generate an XML message. Transmitting the canonicalized outbound data may further include canonicalizing the data contained in the XML message using one or more transformation rules from the set of transformation rules expressed by the machine-automatable artifacts to produce the canonicalized outbound data, and validating the canonical outbound data using one or more metadata constraints from a subset of the language-specific bindings, after which the canonical outbound data is transmitted It should be understood that the machine-automatable artifacts may include a set of extensible markup language schema definitions (XSDs) that express the set of metadata constraints and may also include a set of canonical extensible stylesheet language transformations (XSLTs) that express the set of transformation rules.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 5-8 are flowcharts illustrating operations and processes that implement particular aspects of various embodiments of the present invention.

DETAILED DESCRIPTION

Figure 1:
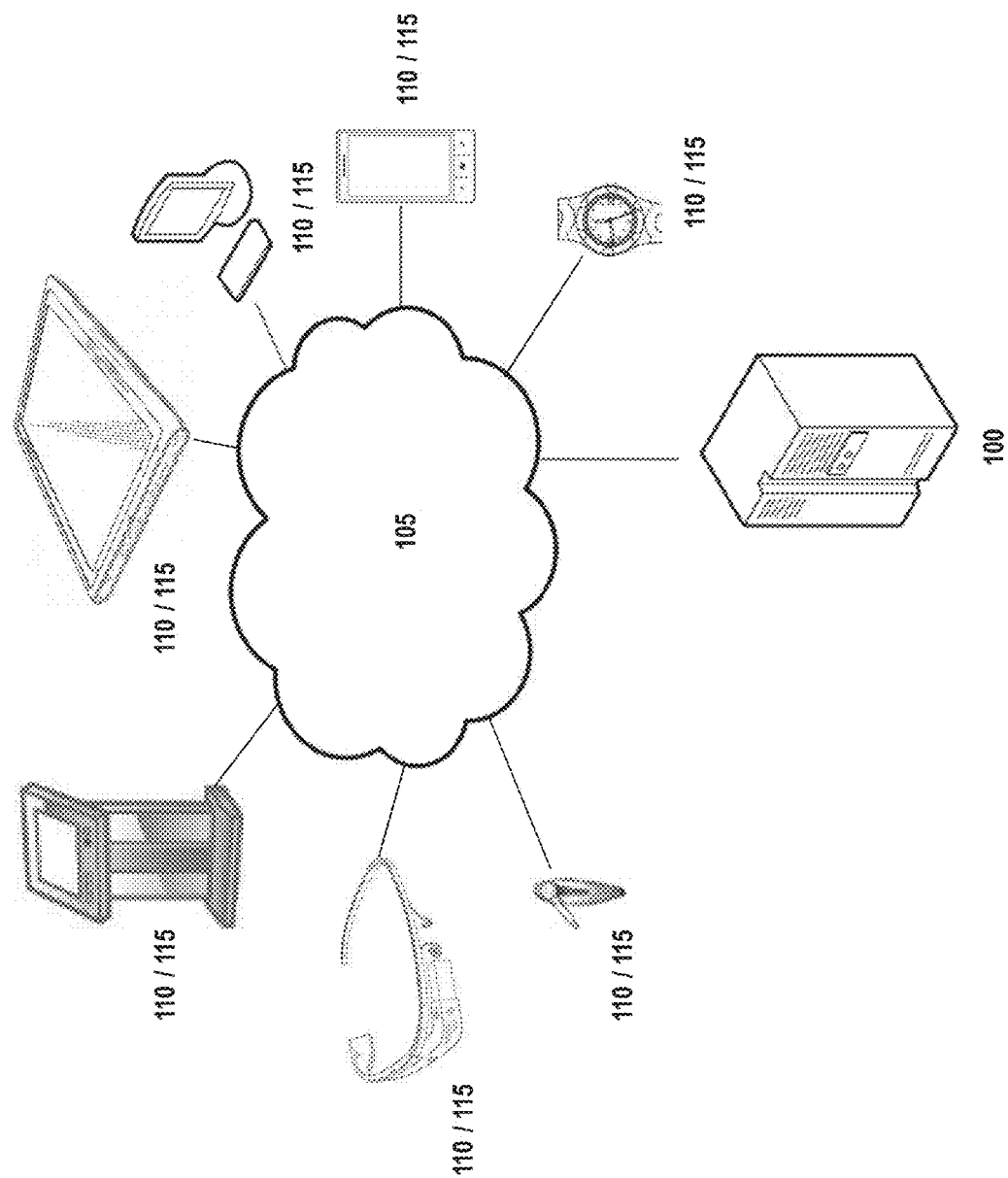
FIG. 1 is an overview of a system that can be used to practice embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of an exemplary embodiment of the present invention. As shown in FIG. 1, this particular embodiment may include one or more management computing entities 100, one or more networks 105, one or more user computing entities 110, and one or more application hosting computing entities 115. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Management Computing Entity

Figure 2:
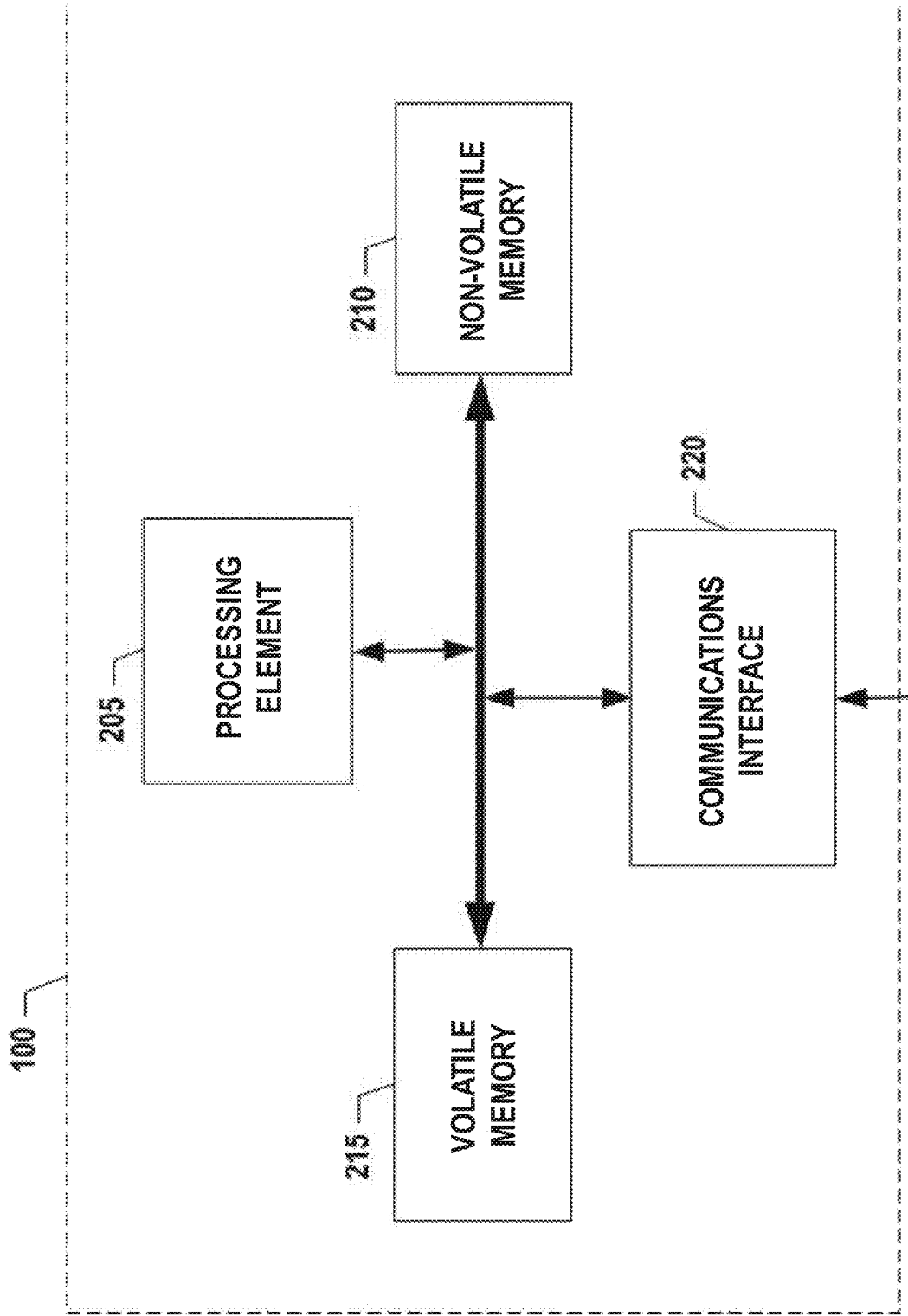
FIG. 2 is an exemplary schematic diagram of a management computing entity according to one embodiment of the present invention.

FIG. 2 provides a schematic of a management computing entity 100 according to one embodiment of the present invention. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user computing entities 110 to provide machine-automatable artifacts that can be used to enforce implementation of a canonical model.

As shown in FIG. 2, in one embodiment, the management computing entity 100 may include or be in communication with one or more processing elements 205 (also referred to as processors, processing circuitry, processing device, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), "cloud" processors, microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. When executed, such code may cause the management computing entity 100 to receive and/or transmit machine-automatable artifacts that can be used to enforce implementation of a canonical model. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system, such as a canonical model artifact repository 408 (described below).

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with a user computing entity 110, such as to transmit machine-automatable artifacts to an application developer or receive new or updated machine-automatable artifacts from a canonical modeler. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for exemplary purposes only and are not limiting to the various embodiments.

2. Exemplary User Computing Entity

Figure 3:
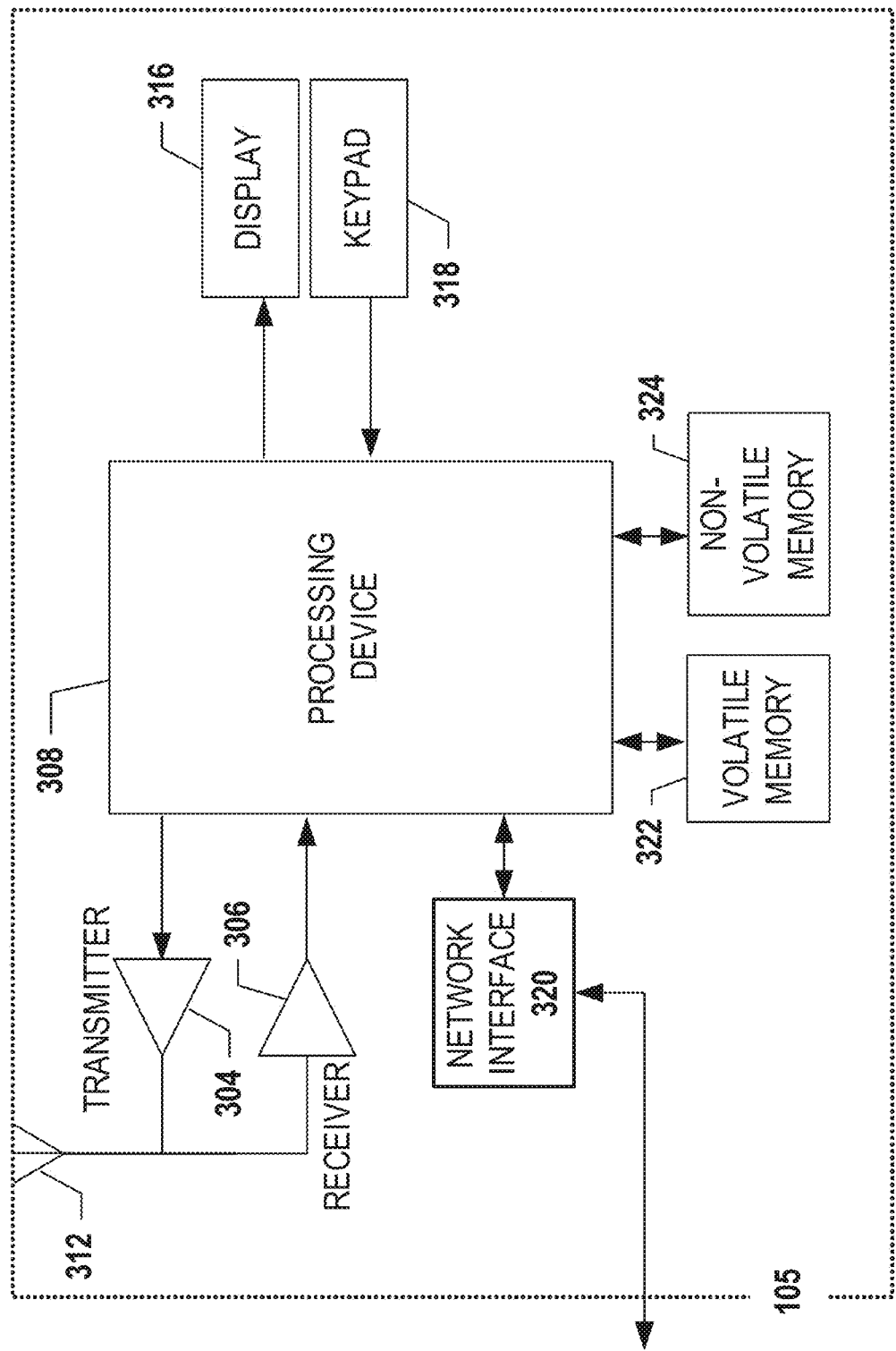
FIG. 3 is an exemplary schematic diagram of a user computing entity according to one embodiment of the present invention.

A user may be an individual, a family, a company, an organization, an entity, a department within an organization, a representative of an organization and/or person, and/or the like. To do so, a user may operate a user computing entity 110 that includes one or more components that are functionally similar to those of the management computing entity 100. FIG. 3 provides an illustrative schematic representative of a user computing entity 110 that can be used in conjunction with embodiments of the present invention. In general, the terms device, system, computing entity, entity, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties, including application developers designing new software for utilization within an enterprise, canonical modelers tasked with implementing, updating, or otherwise maintaining a canonical model, or the like. As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, cloud processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the management computing entity 100. In a particular embodiment, the user computing entity 110 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the management computing entity 100 via a network interface 320.

Via these communication standards and protocols, the user computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

The user computing entity 110 may also comprise a user interface (that can include a display 316 coupled to a processing element 308) and/or a user input interface (coupled to a processing element 308). For example, the user interface may be a user application, browser, user interface, interface, and/or similar words used herein interchangeably executing on and/or accessible via the user computing entity 110 to interact with and/or cause display of information from the management computing entity 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the management computing entity 100, application hosting computing entity 115, and/or various other computing entities.

In another embodiment, the user computing entity 110 may include one or more components or functionality that are the same or similar to those of the management computing entity 100, as described in greater detail above. As will be recognized, these architectures and descriptions are provided for exemplary purposes only and are not limiting to the various embodiments.

3. Exemplary Application Hosting Computing Entity

In one embodiment, an application hosting computing entity 115 may include one or more components that are functionally similar to those of the management computing entity 100 and/or the user computing entity 110. For example, in one embodiment, each application hosting computing entity 115 may include one or more processing elements (e.g., CPLDs, microprocessors, multi-core processors, cloud processors, coprocessing entities, ASIPs, microcontrollers, and/or controllers), one or more display device/ input devices (e.g., including user interfaces), volatile and non-volatile storage or memory, and/or one or more communications interfaces. For example, the user interface may be a user application, browser, user interface, interface, and/or similar words used herein interchangeably executing on and/or accessible via the application hosting computing entity 115 to interact with and/or cause display of information from the management computing entity 100, as described herein. This may also enable the application hosting computing entity 115 to communicate with various other computing entities, such as user computing entities 110, and/or various other computing entities. As will be recognized, these architectures and descriptions are provided for exemplary purposes only and are not limiting to the various embodiments.

III. EXEMPLARY SYSTEM OPERATION

As described above, the growing reliance on software and computer automation to solve various problems and perform various tasks has produced a growing need for integration between the various software applications and computing environments within any given enterprise. Many organizations currently utilize canonical models to facilitate this integration, but do so in an ad hoc and sub-optimal fashion. Application development teams consume a canonical model by creating data contracts that are ostensibly designed to accept inbound messages conforming to the canonical model and format outbound messages to also conform to the canonical model.

At present, however, these data contracts are manually created by application development teams and there is no mechanism for programmatic enforcement of the rules and metadata constraints specified by the canonical model. Instead, because the metadata constraints and transformation rules are manually translated into application logic using custom code developed by each application development team, the possibility for errors and mistakes are numerous. As a result, outbound messages based on the canonical model are often created using manually-designed string concatenation, which is error-prone and time consuming. Moreover, modifying code to reflect the outgoing canonical structure is tedious and canonical model validation rules must be coded manually, because the constraint specifications are not provided by the canonical model, and this manual coding has proven to lead to errors and unreliability of data transmission. For enterprises attempting to utilize canonical models to enhance EAI, the structure of outgoing canonical message can easily become out of sync with the canonical model itself. Given the growing reliance on computerization and the ever-expanding amount of data stored throughout an organization, significant problems (e.g., inefficiency, unreliability, programming burdens, etc.) have emerged from the inability to automatically enforce consistent data communication throughout an enterprise.

In general, embodiments of the present invention provide methods, apparatuses, systems, computing devices, computing entities, and/or the like for automating the enforcement of canonical model implementation and relieving application development teams from having to attempt to manually implement canonical model compliance. As opposed to the manual and ad hoc historical methods of implementing a canonical model, embodiments of the present invention generate constraints and transformation rules that automatically and rigorously enforce canonical model conformity across applications without the need for application development team intervention. Example embodiments described herein thus reduce the burden on application development teams while increasing conformity to the canonical model of the various communications sent between various enterprise applications.

Reference will now be made to FIGS. 4-8.

Figure 4:
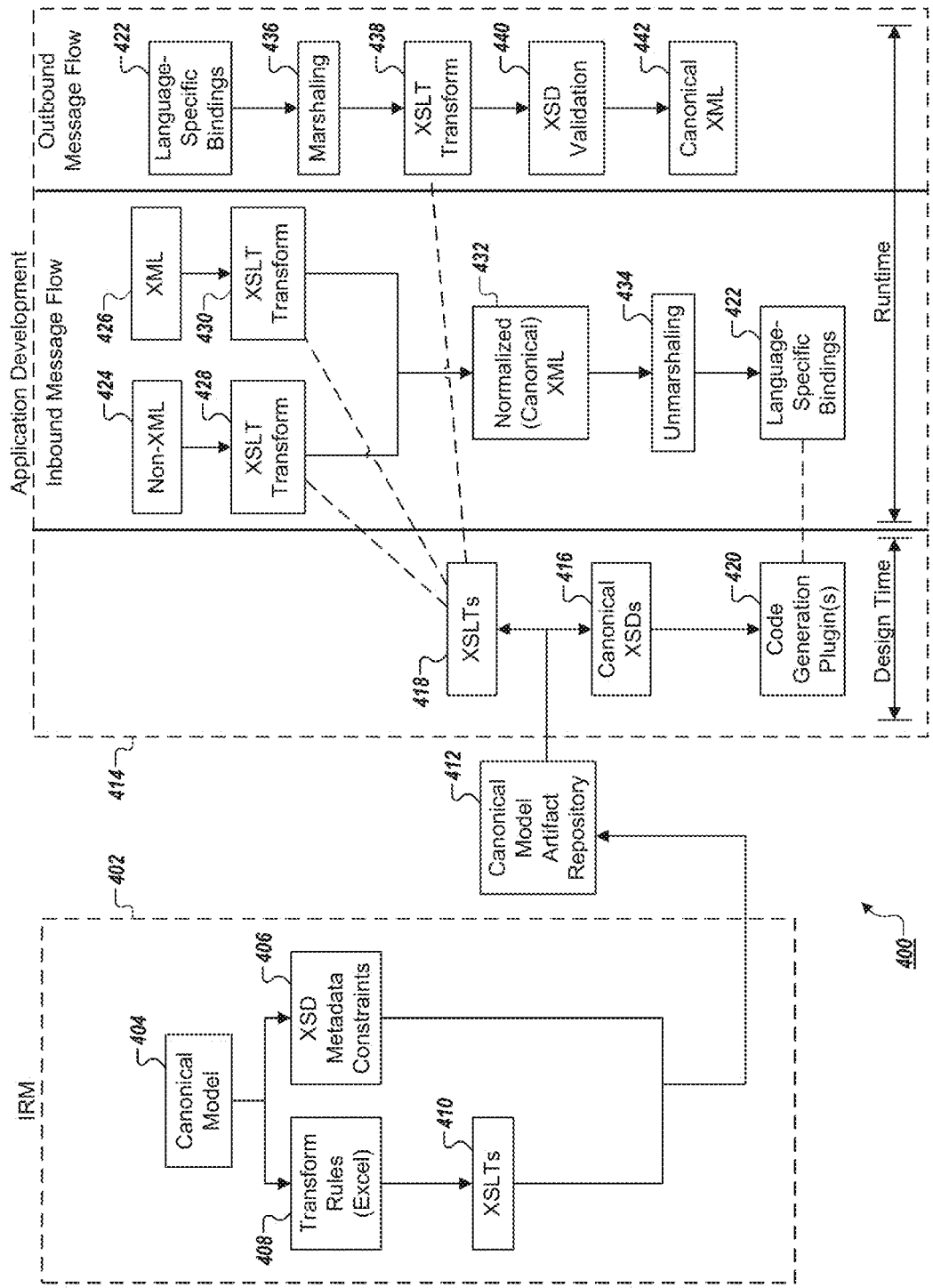
FIG. 4 is a flowchart illustrating system-wide operations and processes that can be used in accordance with various embodiments of the present invention.

FIG. 4 provides a block diagram 400 illustrating system-wide operations and processes that can be used in accordance with various embodiments of the present invention. As illustrated in section 402, on the left side of FIG. 4, canonical modelers may utilize Information Repository Management (IRM) modeling to create a canonical model 404. The canonical model comprises a specification detailing standardized metadata models approved for the enterprise. From the canonical model, canonical modelers may utilize one or more user computing entities 110 to create canonical model artifacts. These artifacts may include metadata constraints 406 of the canonical model, which the canonical modelers may generate using a vendor product (such as DigitalML or the like), and a set of transformation rules 408 of the canonical model, which the canonical modelers may also generate utilizing the one or more computing entities 110. These two principal artifacts can thereafter be extracted and used to enforce adoption of the canonical model by an application. The set of metadata constraints 406, which may be expressed as machine-readable Extensible Markup Language (XML) Schema Definitions (XSDs), comprise metadata representing the structure of individual messages conforming to the canonical model. The transformation rules 408 can be expressed as a series of rules using, for instance, an excel file format, and may be converted for subsequent utilization by application developers into a set of platform-independent Extensible Stylesheet Language Transformations (XSLTs) 410. The transformation rules 408 comprise a set of rules that govern how data elements within a non-canonical message must be transformed to conform to the canonical model. Both the XSD metadata constraints 406 and the XSLTs 410 comprise machine-automatable artifacts, meaning that they can be utilized automatically by a user computing entity 110 or an application hosting computing entity 115, as will be described later.

The machine-automatable artifacts are uploaded to a canonical model artifact repository 412, which is shared both by the canonical modelers who perform the aforementioned IRM modeling and by application developers who create and maintain enterprise applications that may implement the canonical model. By hosting the canonical model artifact repository 412 in a shared location, which may comprise any sort of distributed database system (e.g., a cloud-based repository or the like), canonical modelers can add, revise, or remove artifacts from canonical model artifact repository 412 and application developers can download some or all of the machine-automatable artifacts from canonical model artifact repository 412.

Turning now to section 414 on the right side of FIG. 4, example elements illustrate an example application development space in which machine-automatable artifacts can be utilized by an application developer. Initially, the application developer downloads a set of canonical XSDs 416 and a set of XSLTs 418. As noted previously, the XSDs 416 provide metadata constraints defining the structure required for individual messages to conform to the canonical model. Historically, enforcing the messaging structure provided by XSDs 416 would have required manually developing code based on the particular specifications expressed by the XSDs 416. However, in many embodiments contemplated herein, code generation plugins 420 in the application developer's integrated development environment (IDE) are developed which may convert the downloaded XSDs 416 into language-specific bindings 422, thus enabling subsequent implementation of the metadata constraints expressed by the XSDs 416 without forcing the application developer to write any implementing code manually.

The language-specific bindings comprise classes in the programming language (e.g., a Java or C# class) utilized by the application developer. Once generated, these language-specific bindings can then be called via source code prepared by the application developer. By converting the XSDs 416 into language-specific bindings, any attempt to utilize those language-specific bindings that does not accord with the structure defined by the XSDs 416 would produce a compile-time error. As a result, successful compilation of an application that utilizes the language-specific bindings guarantees proper compliance with the message format expressed by the XSDs 416. A benefit of this approach for application developers is that they can quickly determine the messaging requirements of the canonical model and design the application accordingly.

Having developed the application, the application developer may release it into a production environment within the enterprise. Subsequently, when the application is executed, it may receive inbound messages and transmit outbound messages. As will be readily understood, an application is likely to receive some messages in an inbound message flow that are not in canonical form. The inbound messages may include a non-canonical non-XML message 424 or may include a non-canonical XML message 426. In either case, one or more of the XSLTs 418 may be utilized upon receipt of the non-canonical message to transform the data contained therein into canonical (e.g., normalized) XML data 432, as shown at 428 and 430, respectively. Subsequently, this normalized XML data 432 is unmarshaled (e.g., converted into a language-specific data structure) at 434 and can then be consumed by the application via the language-specific bindings 422.

The application also may transmit an outbound message. To do this, the above process can be reversed. A message may be generated using the language-specific bindings 422 and then marshaled (e.g., converted into a canonical XML structure) at 436. Subsequently, at 438, the application utilizes one or more of the XSLTs 418 to transform the data contained in the outbound message into canonical form. Finally, schema validation step 440 is performed, during which the XSDs are utilized to determine whether the canonicalized XML message departs from canonical form in any respect. Assuming not, the canonicalized XML message can be transmitted.

Having stepped through a broad description of the system-wide operations and processes used in example embodiments of the present invention, FIGS. 5-8 provide flowcharts illustrating operations and processes to implement automated enforcement of a canonical model. By doing so, example embodiments are configured to reduce the burden on application development teams and increase the conformity to the canonical model of the various communications between various enterprise applications. The operations shown in FIGS. 5-8 are performed in example embodiments by one or more computing entities (e.g., one or more user computing entities 110 and/or application hosting computing entities 115) that, as described previously, may include an antenna 312, a transmitter 304 (e.g., radio), a receiver 306 (e.g., radio), a processing element 308, a display 316, a user input interface, a network interface 320, volatile storage or memory 322, and/or non-volatile storage or memory 324.

Figure 5:
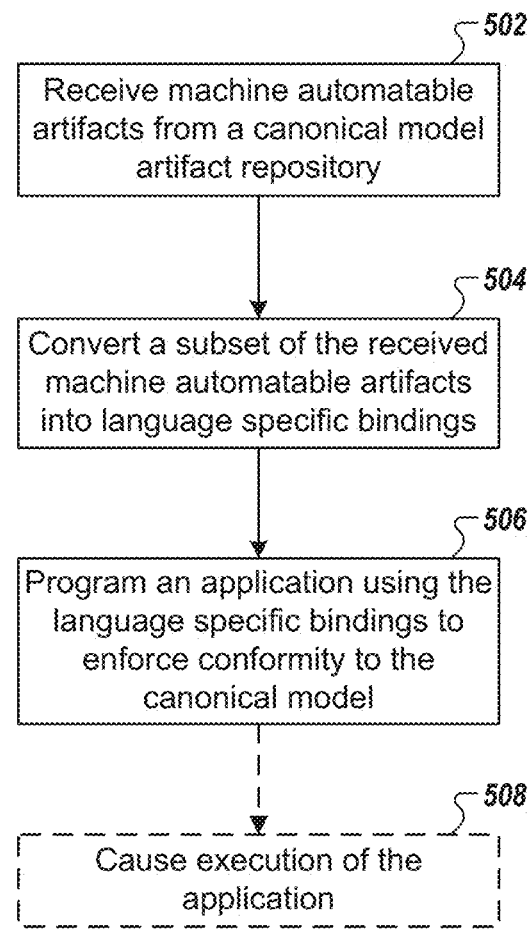

Turning first to FIG. 5, example operations are illustrated by which an application developer may utilize machine-automatable artifacts to enforce implementation of a canonical model, in accordance with some example embodiments of the present invention.

In operation 502, the one or more computing entities include means, such as receiver 306 or the like, for receiving machine-automatable artifacts from a canonical model artifact repository, the machine-automatable artifacts expressing the canonical model using a set of metadata constraints and a set of transformation rules. As described above, in some embodiments the machine-automatable artifacts include a set of XSDs that express the set of metadata constraints. As similarly described above, in some embodiments the machine-automatable artifacts include a set of canonical XSLTs that express the set of transformation rules. The machine-automatable artifacts may be received via a push or a pull paradigm. For instance, as artifacts are added to the repository, they may be globally distributed throughout an enterprise-wide network, or they may be distributed only to some subset of the user base (that may, for instance, be determined based on a likelihood of use), or they may be pushed to every computing entity upon connecting to the network. Based on a pull paradigm, the artifacts may be distributed in response to a generic update request from a computing entity, a specific update request for a particular artifact, or based on a trigger caused by execution of a particular application that is known to utilize particular artifacts stored in the canonical model artifact repository 412.

In operation 504, the one or more computing entities include means, such as processing element 308 or the like, for converting a subset of the received machine-automatable artifacts into language-specific bindings. In this regard, the XSD's may be converted into language-specific bindings at compile-time in an IDE. The remaining artifacts (which may comprise the set of canonical XSLTs) are invoked by the compiled application at runtime. In some embodiments, converting the subset of the received machine-automatable artifacts into language-specific bindings uses one or more code generation plugins. In this regard, the code generation plugins may automatically load each XSD, parse it, and generate the corresponding language-specific binding(s). The language specific binding(s) are then added to the software solution workspace in the IDE. In some embodiments, a user may manually invoke operation of the code generation plugins by loading specific artifacts. Additionally or alternatively, receipt of a new machine-automatable artifact may automatically trigger the IDE(s) running on the one or more computing entities to retrieve language-specific bindings corresponding to the newly received machine-automatable artifact.

In operation 506, the one or more computing entities include means, such as processing element 308 or the like, for programming an application using the language-specific bindings to enforce conformity to the canonical model. For an application written using a language implementing object-orientation, this operation may comprise insertion of source code instantiating an instance of one or more of the language-specific bindings. For instance, the source code for an application may be designed such that, during execution of the application, an instance of a language-specific binding (1) is instantiated in response to receipt of a canonical message, (2) is subsequently hydrated using that canonical message, and (3) outputs a language-specific version of the canonical message usable by the application. Alternatively, the source code for an application may be designed such that, during execution of the application, an instance of a language-specific binding (1) is instantiated and passed outbound data to generate a canonical message, and (after any additional transformations and/or validation has occurred) (2) outputs the canonical message.

Optionally, in operation 508, the one or more computing entities include means, such as transmitter 304, processing element 308, network interface 320, or the like, for causing execution of the application. In this regard, while the application may be executed on the same computing entity used by an application developer, it is likely that the computing entity executing the application will be a different computing entity, and in some embodiments, multiple computing entities within an enterprise may execute the application either jointly, concurrently, in sequence, or some combination thereof. However, the application developer may cause execution of the application by releasing it to a production environment, remotely controlling one or more of the other computing entities to execute the application, or simply by transmitting the application to one or more other computing entities for subsequent execution. In any event, after programming the application using the language-specific bindings, operations occurring during execution of the application will be described in connection with FIGS. 6-8 below.

Turning now to FIG. 6, example operations are illustrated by which one or more computing entities can execute an application (such as an application generated in accordance with FIG. 5 above) to receive and consume inbound data that may or may not comprise canonicalized inbound data, in accordance with some example embodiments of the present invention.

In operation 602, the one or more computing entities include means, such as receiver 306 or the like, for receiving inbound data. The inbound data may comprise canonical XML data, non-canonical XML data, or non-canonical non-XML data, or some combination thereof. It should be understood that the inbound data may be received from a variety of sources (e.g., other applications, data repositories, user interfaces, user input interfaces, or the like).

In operation 604, the one or more computing entities include means, such as processing element 308, or the like, for consuming the inbound data. Consuming the inbound data includes canonicalizing any non-canonical data, unmarshaling the canonical data and using it to hydrate a language-specific binding, after which the data may be utilized as intended by the application. Consuming the inbound data is described in greater detail in conjunction with FIG. 7.

Turning now to FIG. 7, example operations are illustrated by which an executing application can utilize the machine-automatable artifacts to consume inbound data, in accordance with some example embodiments of the present invention.

In optional operation 702, the one or more computing entities include means, such as processing element 308 or the like, for canonicalizing the inbound data using one or more transformation rules from a subset of the language-specific bindings to generate canonical XML data. In this regard, during execution of the application, the application may invoke the transformation rules described to ensure all of the transformation rules and mappings specified in the XSLT(s) are applied to the incoming message. By invoking the transformation rules, any inbound canonical XML data is ensured to be in canonical XML form, and any non-canonical data is converted into canonical XML data.

In operation 704, the one or more computing entities include means, such as processing element 308 or the like, for unmarshaling the canonical XML data. In this regard, unmarshaling the canonical XML data converts that data into a language-specific data structure. In some example embodiments, this may comprise converting canonical XML data into a language-specific data structure. Subsequently, in operation 706, the one or more computing entities include means, such as processing element 308, or the like, for consuming the unmarshaled data using one or more of the language-specific bindings. In some example embodiments, this may comprise instantiating the one or more language-specific bindings and hydrating them with the unmarshaled data. The output of the language-specific bindings comprises a language-specific version of the canonical message usable in the ordinary course by the application.

Figure 8:
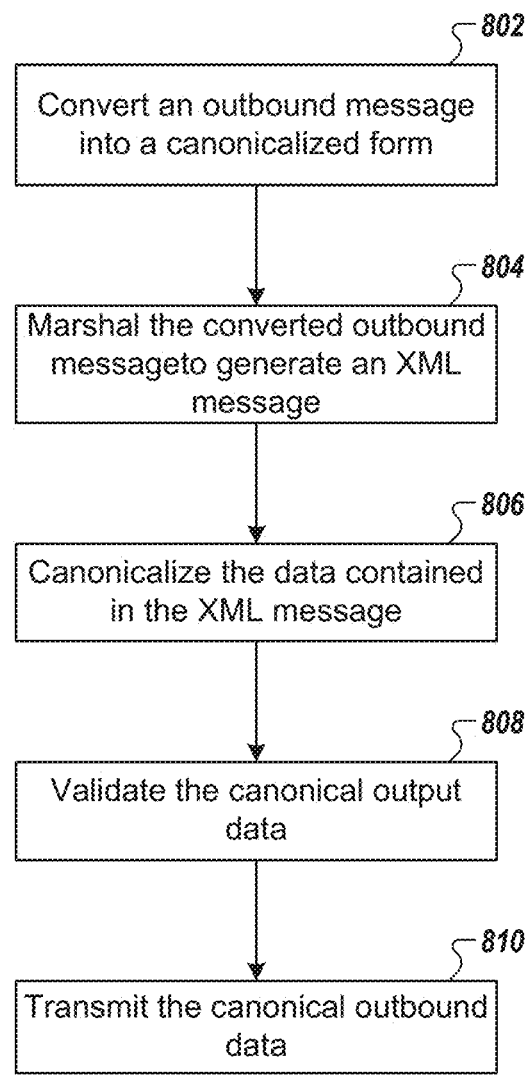

Turning now to FIG. 8, example operations are illustrated by which an executing application can transmit canonicalized outbound data in accordance with some example embodiments of the present invention.

In operation 802, the one or more computing entities include means, such as processing element 308 or the like, for converting the structure of an outbound message into a canonicalized outbound message using one or more of the language-specific bindings. For instance, during execution of the application, an instance of a language-specific binding may be instantiated and passed outbound data generated by the application to generate an outbound message.

In operation 804, the one or more computing entities include means, such as processing element 308 or the like, for marshaling the converted outbound message to generate an XML message. In this regard, marshaling the converted outbound message converts that message into XML form. In this regard, operation 804 may comprise a reversal of operation 704, mentioned above.

In operation 806, the one or more computing entities include means, such as processing element 308 or the like, for canonicalizing the data contained in the XML message using one or more transformation rules from a subset of the language-specific bindings to produce the canonicalized outbound data. In this regard, the XSLT's that express the transformation rules and mappings can be applied to the XML message to convert the XML message into canonical XML message (or ensure that the XML message is already in canonical XML form).

In operation 808, the one or more computing entities include means, such as processing element 308 or the like, for validating the canonical outbound data using one or more metadata constraints from a subset of the language-specific bindings. In this regard, this validation may be performed on the canonical XML message to ensure the structure of the outbound message conforms to the canonical XSD structure.

In operation 810, the one or more computing entities include means, such as transmitter 304, network interface 320, or the like, for, in response to validating the canonical outbound data, transmitting the canonical outbound data. It should be understood that the canonical outbound data may be transmitted to any of a variety of sources (e.g., other applications, data repositories, user interfaces, or the like).

Accordingly, as described in conjunction with FIGS. 4-8, example embodiments of the present invention provide a procedure for automating the enforcement of canonical model implementation. Example embodiments may additionally relieve application developers from having to attempt to manually implement canonical model compliance. As opposed to traditionally manual and ad hoc methods of implementing enterprise-wide adoption and enforcement of a canonical model, embodiments of the present invention generate metadata constraints and transformation rules that automatically and rigorously enforce canonical model validation rules across enterprise applications without the need for manual intervention. Example embodiments described herein thus reduce the burden on application development teams while increasing the conformity to the canonical model of the various communications sent between various enterprise applications.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for enforcing usage of a canonical model, the method comprising:
   receiving, by a computing device including at least one processor, machine-automatable artifacts from a canonical model artifact repository, the machine-automatable artifacts expressing the canonical model using a set of metadata constraints and a set of transformation rules;
   converting, by the computing device, at least a subset of the received machine-automatable artifacts into language-specific bindings;
   programming, by the computing device, an application using the language-specific bindings to automatically enforce conformity of the application to the canonical model;
   receiving, by the computing device, first inbound data in non-canonical form; and
   executing, by the computing device, the application to enable the application to communicate with one or more other applications according to the canonical model in response to utilizing one or more transformation rules of a subset of the language-specific bindings to canonicalize the first inbound data that was initially in non-canonical form.

2. The method of claim 1, wherein converting the received machine-automatable artifacts into language-specific bindings uses one or more code generation plugins.

3. The method of claim 1, wherein executing the application further comprises:
   consuming the first inbound data.

4. The method of claim 1, wherein the application obtains second inbound data that conforms to canonical form from at least one of the applications, the method further comprising:
   consuming the second inbound data which comprises:
   unmarshaling the canonical Extensible Markup Language (XML) data; and
   consuming the unmarshaled canonical XML data using one or more of the language-specific bindings.

5. The method of claim 3, wherein, consuming the first inbound data that is in non-canonical form further comprises:
   canonicalizing the inbound data using the one or more transformation rules from the subset of the language-specific bindings to generate canonical Extensible Markup Language (XML) data;
   unmarshaling the canonical XML data; and
   consuming the unmarshaled canonical XML data using one or more of the language-specific bindings.

6. The method of claim 1, wherein executing the application further comprises transmitting canonicalized outbound data.

7. The method of claim 6, wherein transmitting the canonicalized outbound data comprises:
   converting an outbound message into a canonicalized outbound message using one or more of the language-specific bindings;
   marshaling the converted outbound message to generate an Extensible Markup Language (XML) message;
   canonicalizing the data comprised in the XML message using the one or more transformation rules from the set of transformation rules expressed by the machine-automatable artifacts to produce the canonicalized outbound data;
   validating the canonical outbound data using one or more metadata constraints from a subset of the language-specific bindings; and
   transmitting the canonical outbound data in response to validating the canonical outbound data.

8. The method of claim 1, wherein the machine-automatable artifacts comprise a set of extensible markup language schema definitions (XSDs) that express the set of metadata constraints.

9. The method of claim 1, wherein the machine-automatable artifacts comprise a set of canonical extensible stylesheet language transformations (XSLTs) that express the set of transformation rules.

10. The method of claim 1, wherein:
    utilizing comprises utilizing the transformation rules to canonicalize the inbound data to generate canonical Extensible Markup Language (XML) data.

11. An apparatus for enforcing usage of a canonical model, the apparatus comprising at least one processor and at least one memory including program code, the at least one memory and the program code configured to, with the processor, cause the apparatus to at least:
    receive machine-automatable artifacts from a canonical model artifact repository, the machine-automatable artifacts expressing the canonical model using a set of metadata constraints and a set of transformation rules;
    convert at least a subset of the received machine-automatable artifacts into language-specific bindings;
    program an application using the language-specific bindings to automatically enforce conformity of the application to the canonical model;
    receive first inbound data in non-canonical form; and
    execute the application to enable the application to communicate with one or more other applications according to the canonical model in response to utilizing one or more transformation rules of a subset of the language-specific bindings to canonicalize the first inbound data that was initially in non-canonical form.

12. The apparatus of claim 11, wherein converting the received machine-automatable artifacts into language-specific bindings uses one or more code generation plugins.

13. The apparatus of claim 11, wherein execute the application further comprises:
    consuming the first inbound data.

14. The apparatus of claim 11, wherein the application obtains second inbound data that conforms to canonical form from at least one of the applications, wherein the at least one memory and the program code are further configured to, with the processor, cause the apparatus to:
    consume the inbound data by:
    unmarshaling the canonical Extensible Markup Language (XML) data;
    and
    consuming the unmarshaled canonical XML data using one or more of the language-specific bindings.

15. The apparatus of claim 13, wherein consuming the first inbound data that is in non-canonical form comprises:
    canonicalizing the first inbound data using the one or more transformation rules from the subset of the language-specific bindings to generate canonical Extensible Markup Language (XML) data;
    unmarshaling the canonical XML data; and
    consuming the unmarshaled canonical XML data using one or more of the language-specific bindings.

16. The apparatus of claim 11, wherein execute the application comprises transmitting canonicalized outbound data.

17. The apparatus of claim 16, wherein transmitting the canonicalized outbound data comprises:
    converting an outbound message into a canonicalized outbound message using one or more of the language-specific bindings;
    marshaling the converted outbound message to generate an XML message;
    canonicalizing the data contained in the Extensible Markup Language (XML) message using the one or more transformation rules from the set of transformation rules expressed by the machine-automatable artifacts to produce the canonicalized outbound data;
    validating the canonical outbound data using one or more metadata constraints from a subset of the language-specific bindings; and
    transmitting the canonical outbound data in response to validating the canonical outbound data.

18. The apparatus of claim 11, wherein the machine-automatable artifacts comprises a set of extensible markup language schema definitions (XSDs) that express the set of metadata constraints and a set of canonical extensible stylesheet language transformations (XSLTs) that express the set of transformation rules.

19. The apparatus of claim 11, wherein the at least one memory and the program code are further configured to, with the processor, cause the apparatus to:
    perform the utilizing by utilizing the transformation rules to canonicalize the inbound data to generate canonical Extensible Markup Language (XML) data.

20. A computer program product for enforcing usage of a canonical model, the computer program product comprising at least one non-transitory computer-readable storage medium having computer-readable program code portions stored therein, the computer-readable program code portions comprising:
    an executable portion configured to receive machine-automatable artifacts from a canonical model artifact repository, the machine-automatable artifacts expressing the canonical model using a set of metadata constraints and a set of transformation rules;
    an executable portion configured to convert at least a subset of the received machine-automatable artifacts into language-specific bindings;
    an executable portion configured to program an application using the language-specific bindings to automatically enforce conformity of the application to the canonical model;
    an executable portion configured to cause receipt of first inbound data in non-canonical form; and
    an executable portion configured to execute the application to enable the application to communicate with one or more other applications according to the canonical model in response to utilizing one or more transformation rules of a subset of the language-specific bindings to canonicalize the first inbound data that was initially in non-canonical form.

21. The computer program product of claim 20, wherein:
    utilizing comprises utilizing the transformation rules to canonicalize the inbound data to generate canonical Extensible Markup Language (XML) data.

* * * * *